(12) United States Patent
Pomerantz

(10) Patent No.: US 8,509,562 B2
(45) Date of Patent: Aug. 13, 2013

(54) FOCUS-BASED EDGE DETECTION

(75) Inventor: Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/596,800

(22) Filed: Aug. 28, 2012

(65) Prior Publication Data

US 2012/0321179 A1    Dec. 20, 2012

Related U.S. Application Data

(63) Continuation of application No. 12/349,848, filed on Jan. 7, 2009, now Pat. No. 8,331,688.

(51) Int. Cl.
*G06K 9/00* (2006.01)

(52) U.S. Cl.
USPC .......................................... 382/275; 382/285

(58) Field of Classification Search
USPC ................................................ 382/275, 165
See application file for complete search history.

(56) References Cited

U.S. PATENT DOCUMENTS

| | | | |
|---|---|---|---|
| 6,219,461 B1 * | 4/2001 | Wallack | 382/285 |
| 6,269,197 B1 * | 7/2001 | Wallack | 382/285 |
| 6,483,950 B1 | 11/2002 | Wallack | 382/285 |
| 6,647,146 B1 | 11/2003 | Davison et al. | 382/199 |
| 6,778,698 B1 | 8/2004 | Prakash et al. | 382/164 |
| 7,929,798 B2 * | 4/2011 | Subbotin | 382/275 |
| 7,953,288 B2 * | 5/2011 | Metcalfe et al. | 382/266 |
| 8,035,704 B2 * | 10/2011 | Hu et al. | 348/246 |
| 8,218,898 B2 * | 7/2012 | Subbotin | 382/275 |
| 2002/0126899 A1 | 9/2002 | Farrell | 382/199 |
| 2005/0024517 A1 | 2/2005 | Luciano et al. | 348/333.03 |
| 2006/0078217 A1 | 4/2006 | Poon et al. | 382/255 |
| 2006/0159343 A1 | 7/2006 | Grady | 382/180 |
| 2007/0065002 A1 | 3/2007 | Marzell | 382/154 |
| 2007/0104363 A1 * | 5/2007 | Yoshiura et al. | 382/165 |
| 2007/0110300 A1 | 5/2007 | Chang et al. | 382/162 |
| 2007/0127810 A1 | 6/2007 | Liu | 382/154 |
| 2007/0127836 A1 * | 6/2007 | Subbotin | 382/260 |
| 2007/0165234 A1 | 7/2007 | Podoleanu | 356/451 |
| 2007/0297665 A1 | 12/2007 | Segev | 382/141 |
| 2008/0043124 A1 * | 2/2008 | Subbotin | 348/250 |
| 2008/0056607 A1 * | 3/2008 | Ovsiannikov | 382/275 |

FOREIGN PATENT DOCUMENTS

| | | |
|---|---|---|
| CN | 1302999 | 7/2001 |
| GB | 2328127 | 4/2002 |
| JP | 04011468 | 1/1992 |
| JP | 2003168133 | 6/2003 |

* cited by examiner

*Primary Examiner* — Hadi Akhavannik
(74) *Attorney, Agent, or Firm* — VanLeeuwen & VanLeeuwen; Jeffrey S. LaBaw

(57) ABSTRACT

A model generator computes a first image perimeter color difference value for each of a plurality of first pixels included in a first image that is captured using a first focal length, and selects one of the first image perimeter color difference values that exceeds a perimeter color difference threshold. Next, the model generator computes a second image perimeter color difference value for each of a plurality of second pixels included in a second image that is captured using a second focal length, and selects one of the second image perimeter color difference values that exceeds the perimeter color difference threshold. The model generator then determines that an edge is located at the first focal length by detecting that the selected first image perimeter color difference value is greater than the selected second image perimeter color difference value, and generates an image accordingly.

18 Claims, 17 Drawing Sheets

FOCUS-BASED EDGE DETECTION

RELATED APPLICATION

This application is a continuation of U.S. application Ser. No. 12/349,848, filed Jan. 7, 2009, titled "Focus-based Edge Detection," and having the same inventors as the above-referenced application.

BACKGROUND OF THE INVENTION

1. Technical Field

The present invention relates to generating a 3-dimensional model using focused-based edge detection. More particularly, the present invention relates to analyzing multiple images taken at different focal lengths, and identifying relative distances of edges based upon computed color difference values.

2. Description of the Related Art

Model generators create 3-dimensional models that typically include multiple objects. The 3-dimensional models are subsequently used in other applications such as video games, mapping applications, etc. Objects within the model usually comprise polygons. During model generation, the model generator requires relative viewing distance information in order to create a 3-dimensional effect of the objects.

SUMMARY

A model generator retrieves a plurality of first pixels included in a first image that is captured using a first focal length. The model generator then computes a first image perimeter color difference value for each of the plurality of first pixels, and selects one of the first image perimeter color difference values that exceeds a perimeter color difference threshold.

Next, the model generator retrieves a plurality of second pixels included in a second image that is captured using a second focal length. The model generator then computes a second image perimeter color difference value for each of the plurality of second pixels, and selects one of the second image perimeter color difference values that exceeds the perimeter color difference threshold. The model generator then determines that an edge is located at the first focal length by detecting that the selected first image perimeter color difference value is greater than the selected second image perimeter color difference value. In turn, the model generator generates a model based upon determining that the edge is located at the first focal length.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
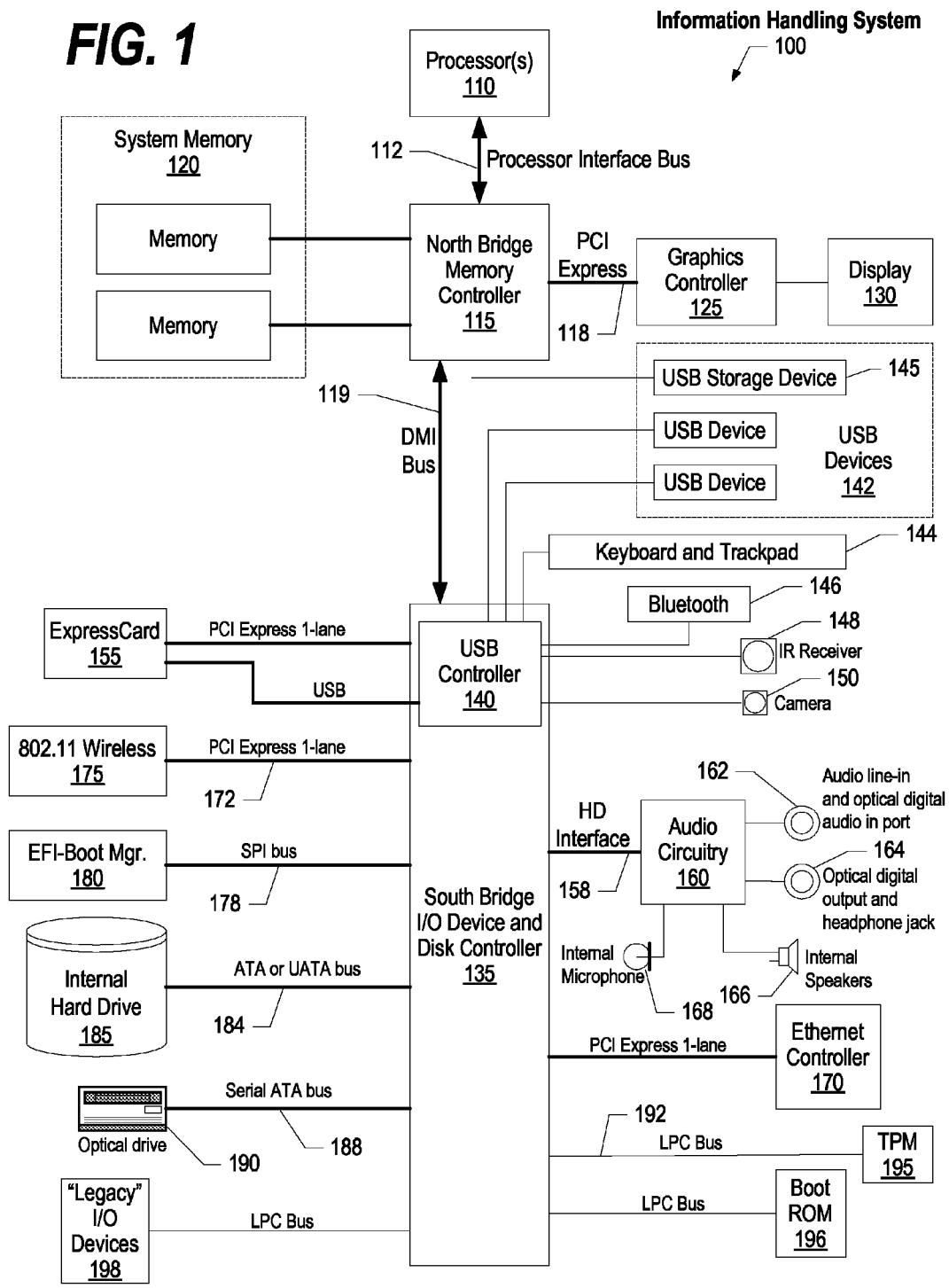
FIG. 1 is a block diagram of a data processing system in which the methods described herein can be implemented.
Figure 2:
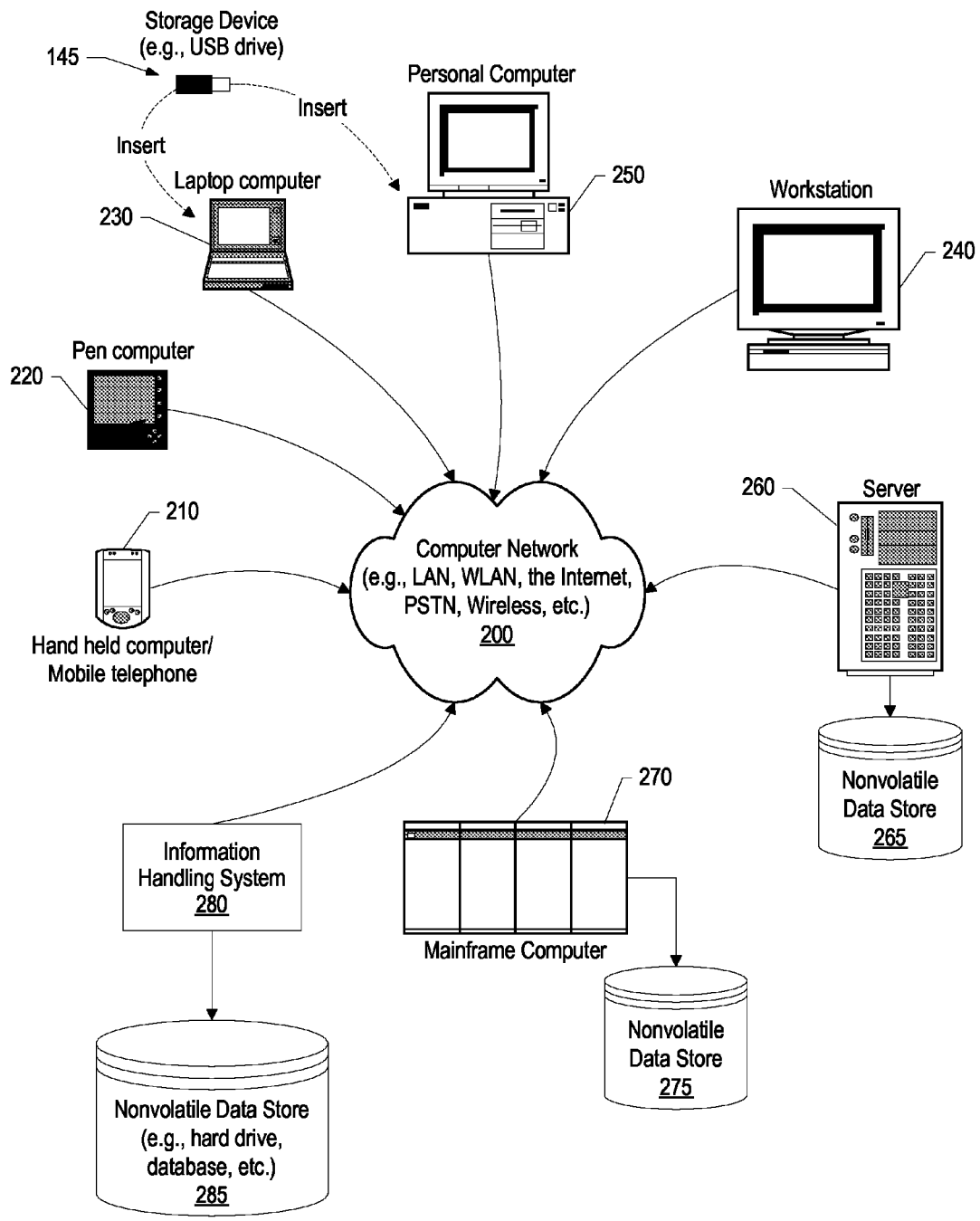
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
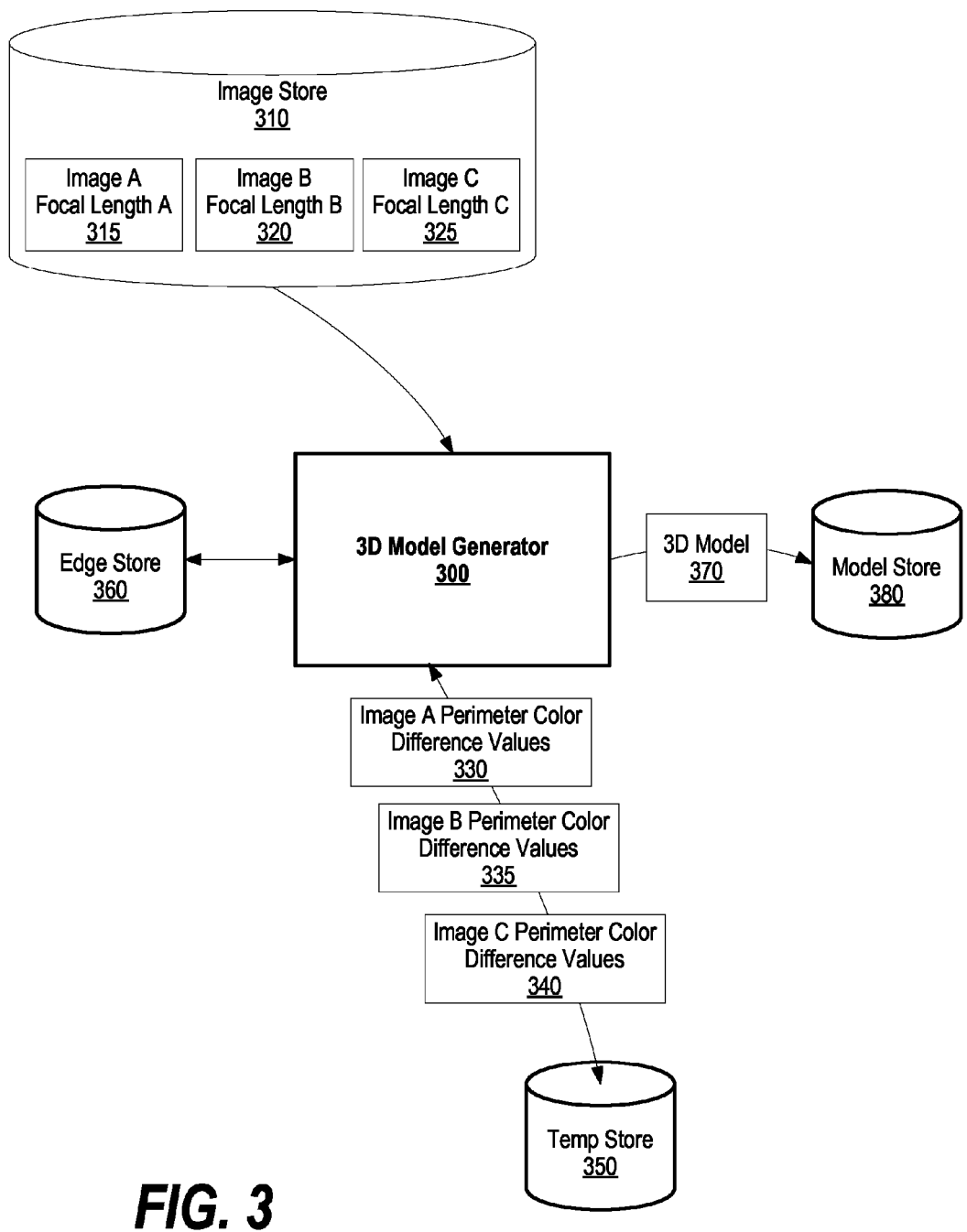
FIG. 3 is a diagram showing a model generator analyzing images taken at different focal lengths and creating a 3-dimensional (3D) model based upon detecting edge locations at particular focal lengths.

FIG. 3 is a diagram showing a model generator analyzing images taken at different focal lengths and creating a 3-dimensional (3D) model based upon detecting edge locations at particular focal lengths.

A user captures multiple images of a scene (using different focal lengths) and stores the images in image store 310. For example, a user may capture images in 5 foot focal length increments starting at 5 feet and ending at 50 feet, resulting in ten different images all taken at different focal lengths. The simplified example shown in FIG. 3 includes three images A 315, B 320, and C 325 taken at three different focal lengths A, B, and C, respectively.

3-D model generator 300 retrieves the first image A 315 and analyzes each pixel included in image 315. The number of pixels included in image A 315 depends upon the user's camera resolution. For example, the user may use a 6 megapixel cameral to capture image A 315, which results in image A 315 including around 6 million pixels.

3D model generator 300 selects one of image A 315's pixels and defines a contributing perimeter around the selected pixel. 3D model generator defines the size of the contributing perimeter based upon how out of focus even the most focused image would be. For example, if five images are captured at focal lengths 10, 20, 30, 40, and 50 feet, an object will be at most 5 feet out of focus (objects at 15, 25, etc.). As another example, if ten images are captured at focal lengths 10, 15, 20, 25, 30, 35, 40, 45, 50, and 55 feet, the object will be at most 2.5 feet out of focus (objects at 12.5, 17.5, etc.). In this example, since the "circle of confusion" is smaller, the contributing perimeter size is smaller. As one skilled in the art can appreciate, the circle of confusion is an optical spot caused by a cone of light rays from a lens that does not come to a perfect focus when imaging a point source.

3D model generator 300 then identifies perimeter pixel pairs (opposing pixels) that lie along the contributing perimeter and computes pixel pair color difference values for each perimeter pixel pair. For example, 3D model generator may identify ten different pixel pairs that correspond to the selected pixel. After 3D model generator 300 computes a color difference value for each perimeter pixel pair, 3D model generator 300 identifies the pixel pair with the largest color difference value and stores the value as a perimeter color difference value for the selected pixel. 3D model generator 300 performs the above steps for each pixel within image A 315 and stores the results as Image A perimeter color difference values 330 in temporary store 350. Temporary store 350 may be stored on a nonvolatile storage area, such as a computer hard drive.

Next, 3D model generator 300 retrieves image B 320 and analyzes pixels included in image B 320. In turn, 3D model generator 300 stores Image B 320's results as image B perimeter color difference values 335 in temporary store 350. Likewise, 3D model generator 300 retrieves image C 325 and evaluates pixels included in image C 325. 3D model generator 300 then stores the evaluation results as Image C perimeter color difference values 340 in temporary store 350.

Once 3D model generator 300 evaluates each pixel within each image, 3D model generator 300 retrieves perimeter color difference values 330, 335, and 340, and perimeter color difference values that exceed a perimeter color difference threshold. 3D model generator 300 then categorizes the selected pixels as edge pixels.

In order to identify the relative distance of an edge (e.g., distance from the camera that captured the image), 3D model generator 300 evaluates the edge pixels and determines which image (image A 315, image B 320, or image C 325) produced the largest perimeter color difference value for a particular edge pixel. The image that produces the largest perimeter color difference value for an edge pixel was captured using a focal length closest to the location of the edge (see FIG. 8B and corresponding text for further details).

Once 3D model generator 300 processes each of the edge pixels and determines their relative distance, 3D model generator 300 generates and stores 3D model 370 in model store 380. Model store 380 may be stored on a nonvolatile storage area, such as a computer hard drive.

Figure 4:
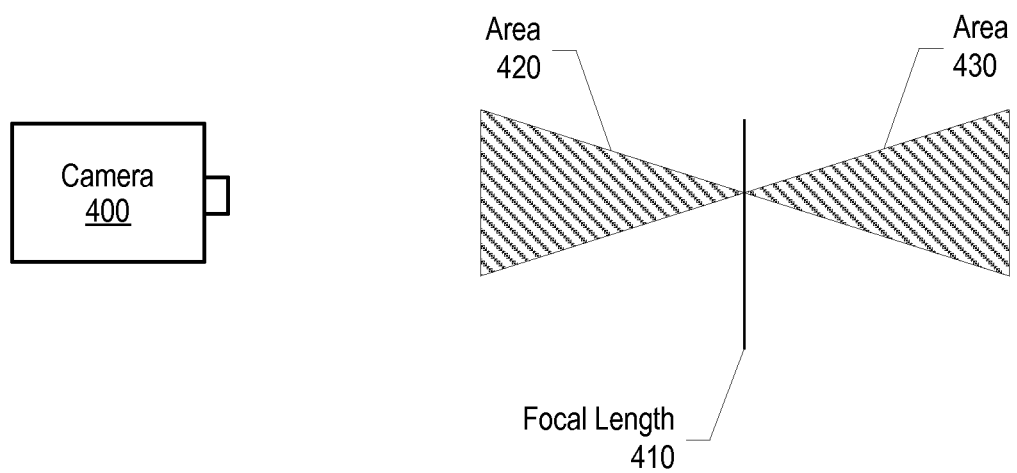
FIG. 4 is a diagram showing light contributions for a pixel at a particular focal length.

FIG. 4 is a diagram showing light contributions for a pixel at a particular focal length. Each pixel in a photograph is a sum of light from camera 400's particular angle at camera 400's set focal length 410 along with light from a range of angles from other distances encompassed by areas 420 and 430.

As can be seen, the greater the difference between the source of light and the focal distance, the greater the range of angles. As a result, when an edge exists between two planes the edge appears sharp when it is in focus, and become more blurred as it gets out of focus (see FIG. 5 and corresponding text for further details).

Figure 5:
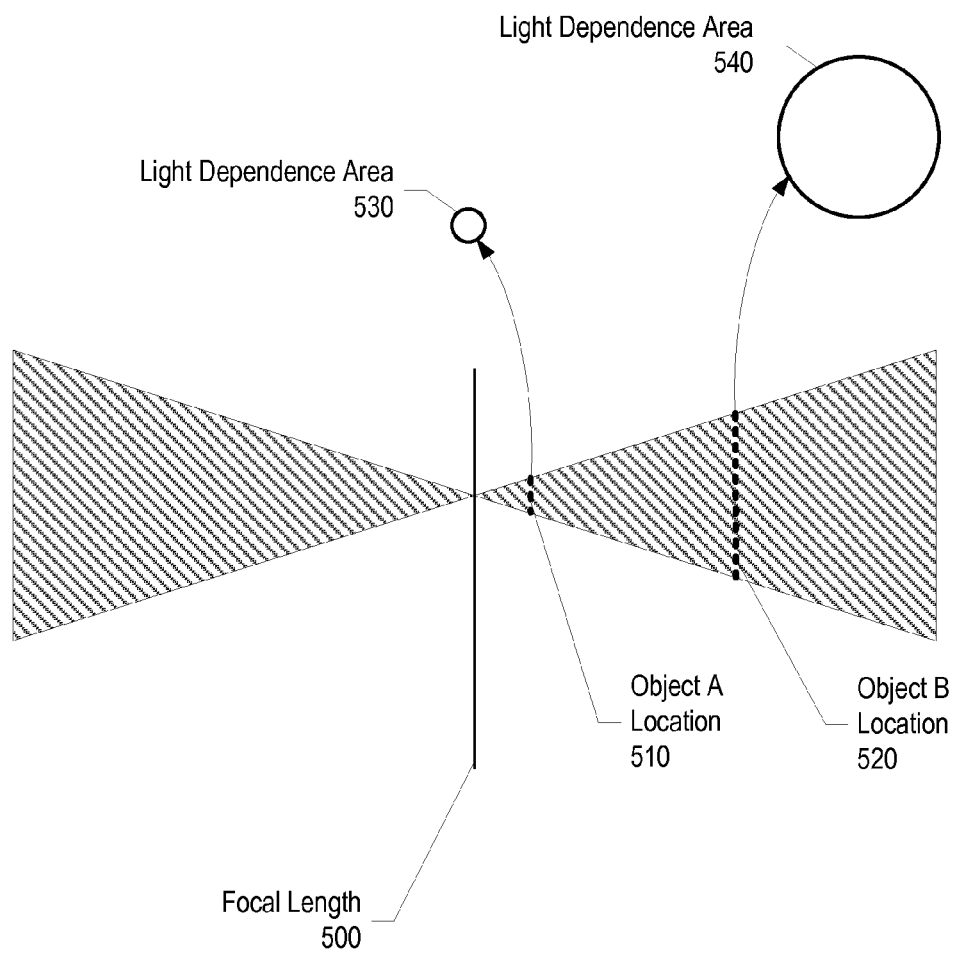
FIG. 5 is a diagram showing object light dependence areas relative to the distance an object is located from an image focal length.

FIG. 5 is a diagram showing object light dependence areas relative to the distance an object is located from an image focal length. A camera captures an image at focal length 500. The image includes an object A and an object B that are at object A location 510 and object B location 520, respectively. The image includes pixels that capture light reflected from both object A and object B. Each pixel corresponding to object A is subject to receiving light from a particular area around the pixel. This area is dependent upon the distance object A is from focal length 500. FIG. 5 shows the size of this light dependence area is light dependence area 530.

Regarding object B, each pixel corresponding to object B is subject to receiving light from an area equal to light dependence area 540. As can be seen, light dependence area 540 is larger than light dependence area 530 due to the fact that object B is out of focus more than object A (i.e. further away from focal length 500). As a result, color differences between two adjoining pixels for object B will be less than they will be for those corresponding to object A.

Figure 6:
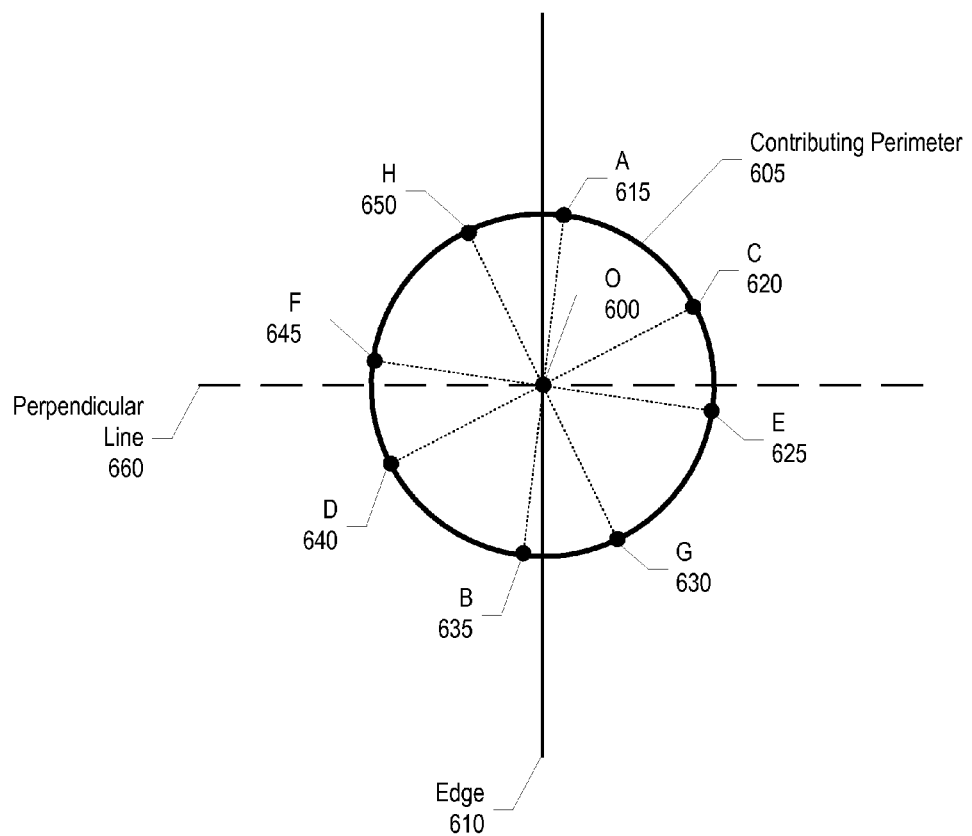
FIG. 6 is a diagram showing a pixel along an edge location and the pixel's corresponding perimeter pixel pairs.

FIG. 6 is a diagram showing a pixel along an edge location and the pixel's corresponding perimeter pixel pairs. When a model generator evaluates pixel 600, the model generator identifies contributing perimeter 605 and pixels along contributing perimeter 605 (pixels A 615-H 650). The model generator then groups the perimeter pixels into opposing pairs. FIG. 6 shows perimeter pixel pairs A 615 and B 635; C 620 and D 640; E 625 and F 645; and G 630 and H 650.

Once the pixel pairs are identified, the model generator computes a pixel pair color difference value for each of the pixel pairs. As discussed later in FIG. 7, as a perimeter pixel moves away from an edge, the pixel receives a larger percentage of light from a particular light source. As can be seen in FIG. 6, perimeter pixel pair E 625 and F 645 are farthest away from edge 610 and, therefore, have the largest color difference value. The model generator labels the identified pixel pair as pixel O 600's "perimeter color difference value."

In addition, the pixel pair that is farthest away from edge 610 is also the pair that is closest to perpendicular line 660, which is a line that is perpendicular to edge 610. The model generator uses this information to determine edge 610's orientation while generating a model that includes edge 610.

Figure 7:
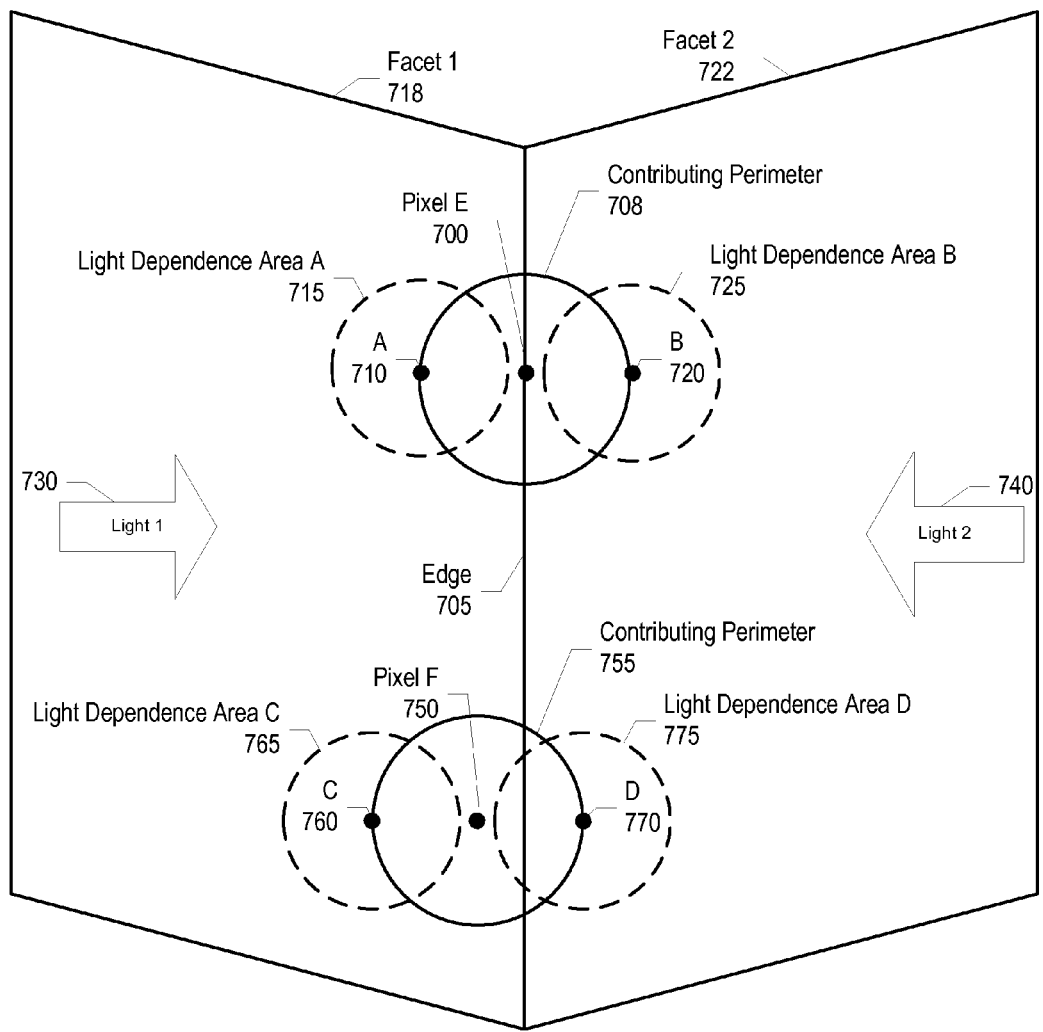
FIG. 7 is a diagram showing light contributions for various pixel pairs in proximity to an edge location.

FIG. 7 is a diagram showing light contributions for various pixel pairs in proximity to an edge location. Pixel E 700 lies along edge location 705, which facet 1 718 and facet 2 722 creates. When a model generator evaluates pixel E 700, the model generator defines contributing perimeter 708 and identifies perimeter pixel pairs along contributing perimeter 708. Once the model generator identifies the perimeter pixel pairs, the model generator computes a pixel pair color difference value for each of the perimeter pixel pairs. Pixels A 710 and B 720 are a perimeter pixel pair that are perpendicular to edge 705 and, therefore, has the largest color difference value (discussed in FIG. 6).

FIG. 7 shows that pixel A 710 receives light contributions from light dependence area A 715. Meaning, all light within light dependence area A 715 contributes to the color of pixel A 710. As can be seen, light 1 730 is the only light that contributes to light dependence area A 715 since light dependence area A 715 is entirely to the left of edge 705 on facet 1 718. Likewise with pixel B 720, light dependence area B 725 is entirely to the right of edge 705 on facet 2 722 and, therefore, light 2 740 contributes fully to pixel B 720's color.

As the model generator evaluates adjoining pixels away from edge 705, the adjoining pixel's corresponding perimeter pixel pairs begin to receive light contributions from both light 1 730 and light 2 740. As can be seen, pixel F 750 has a corresponding contributing perimeter 755 that includes perimeter pixel pair C 760 and D 770. Pixel C 760 receives light from light dependence area C 765, which only receives contributions from light 1 730. However, pixel D 770 receives light from light dependence area D 775, which is, in part, on facet 1 718. As such, pixel D 770 receives contributions mostly from light 2 740, but also receives contributions from light 1 730. As a result, the color difference value between pixel C 760 and D 770 is not as great as the color difference value between pixel A 710 and B 720 because light 1 730 contributes to both pixel C 760 and D 770. As the model generator evaluates pixels farther away from edge 705, their corresponding pixel pair color difference values get less (see FIG. 8A and corresponding text for further details).

Figure 8A:
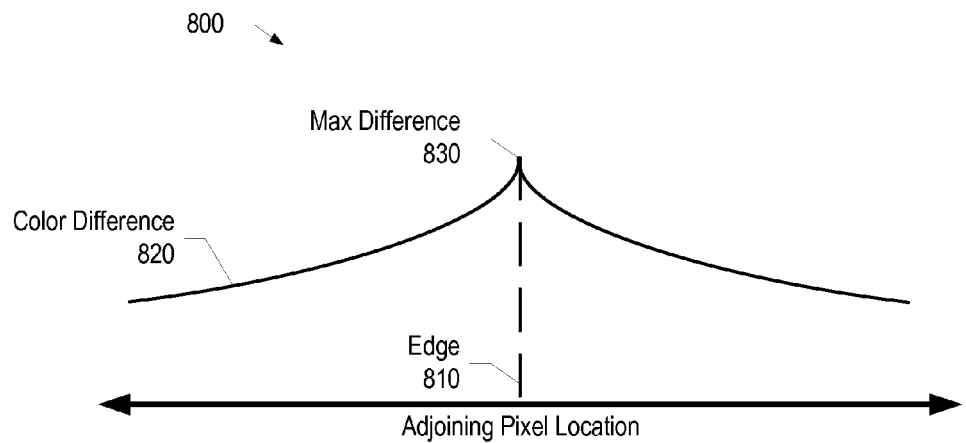
FIG. 8A is a diagram showing perimeter color difference values for adjoining pixels based upon their relative distance from an in-focus edge.

FIG. 8A is a diagram showing perimeter color difference values for adjoining pixels based upon their relative distance from an in-focus edge. As discussed in FIG. 7, perimeter color difference values increase when a pixel is in proximity to an edge location. Graph 800 shows that color difference 820 increases for pixels residing closer to edge 810, and decreases for pixels residing farther away from edge 810. A model generator utilizes this information to identify maximum difference 830, which signifies an edge location (edge 810).

Figure 8B:
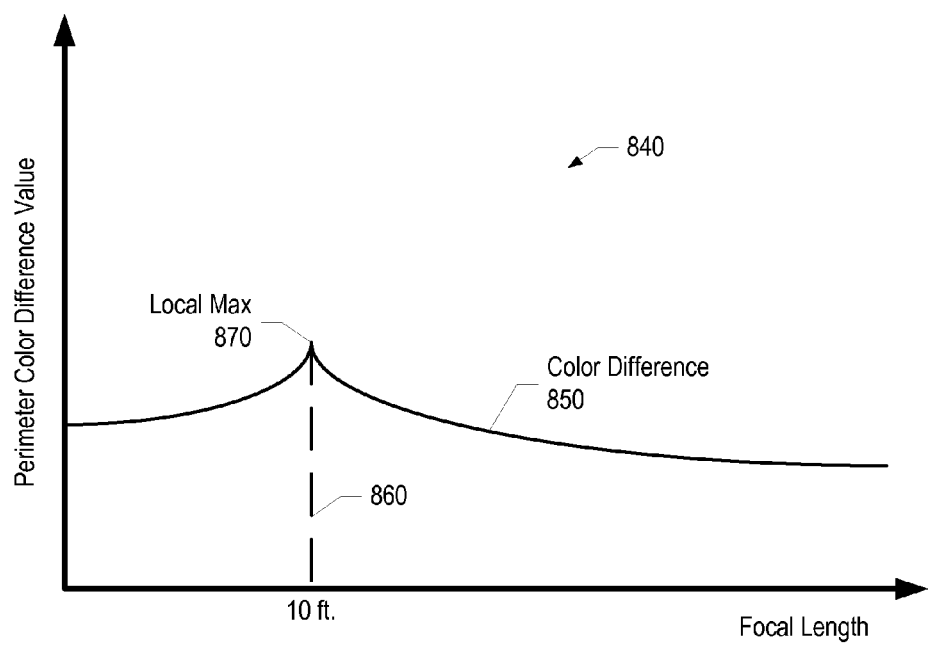
FIG. 8B is a diagram showing perimeter color difference values based upon an edge location's relative distance from an image's focal length.

FIG. 8B is a diagram showing perimeter color difference values based upon an edge location's relative distance from an image's focal length. As discussed in FIG. 4, a pixel receives light contributions from a larger variety of light sources when the pixel is out of focus. Conversely, the pixel receives light contributions from a specific light source when the pixel is in focus. As a result, an out-of-focus pixel's perimeter color difference value is less than an in-focus pixel due to the fact that the out-of-focus pixel's perimeter pixel pair receive light contributions from multiple light sources, thus making the color difference between the two perimeter pixels smaller compared with an in-focus pixel whose perimeter pixels receive light contributions specifically from different light sources (see FIG. 5 and corresponding text for further details).

Graph 840 shows a perimeter color difference value relationship between in-focus pixel's and out-of-focus pixels. The example shown in FIG. 8B corresponds to image data of an edge that is 10 feet from a camera. As can be seen, color difference 850 is largest at focal length 860 (local maximum color difference value 870), which is a 10 foot focal length. As images are taken with focal lengths further away from the 10 foot focal length, pixels included in the images have less color difference values. The model generator utilizes this information to identify an edge location's focal length distance from the camera. FIG. 8B assumes that an edge is a "simple" edge. A simple edge comprises two facets that are part of a single object, such as a corner of a house. An image may also include "complex" edges, which comprise one facet from one object and another facet from a different object at a different focal length, such as a house and a detached garage behind the house (see FIGS. 9-11, 12B, 13, and corresponding text for further details).

Figure 9:
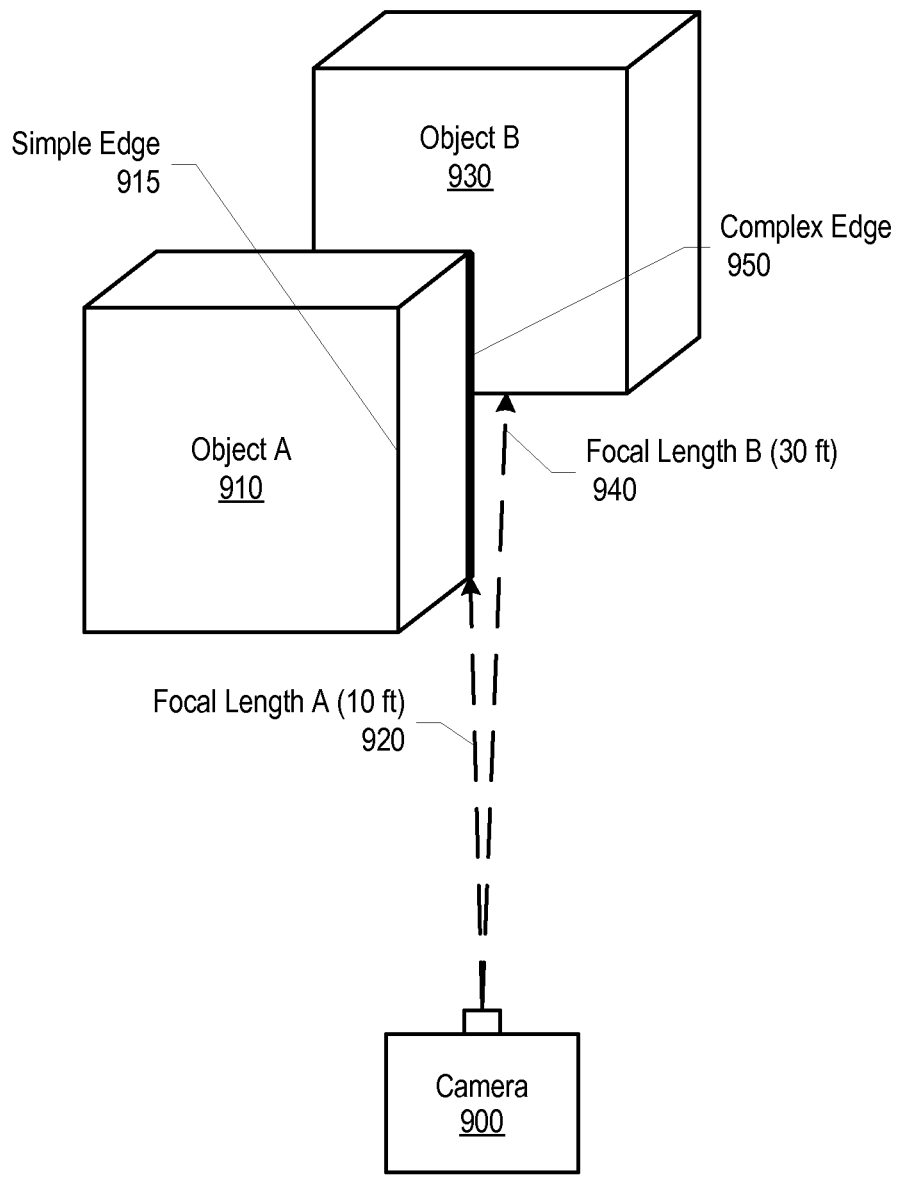
FIG. 9 is a diagram showing objects located at different focal lengths, which produces a complex edge.

FIG. 9 is a diagram showing objects located at different focal lengths, which produces a complex edge. Camera 900 captures multiple images of object A 910 and object B 930 at different focal lengths. For example, camera 900 may capture images in 5-foot focal length increments starting at 5 feet and ending at 50 feet, resulting in ten different images all taken at different focal lengths.

When a model generator processes the ten different images, the model generator identifies object A 910's simple edge 915 as previously discussed in FIGS. 6-8B. However, the "intersection" of object A 910 and object B 930 creates complex edge 950 because object A 910's facet (right side facet) is at a different focal length that object B 930's facet (center facet).

A complex edge has different color difference characteristics than a simple edge due to the fact that a given image has one facet in focus and the other facet out of focus. Using FIG. 9 as an example, the image taken with a focal length of 10 feet has object A 910's facet in focus and object B 930's facet out of focus. Likewise, the image taken with a focal length of 30 feet has object A 910's facet out of focus and object B 930's facet in focus. In addition, a complex edge produces two different local maximum color values (one at each focal length) compared to a simple edge that has one local maximum color value (see FIG. 13 and corresponding text for further details).

Figure 10:
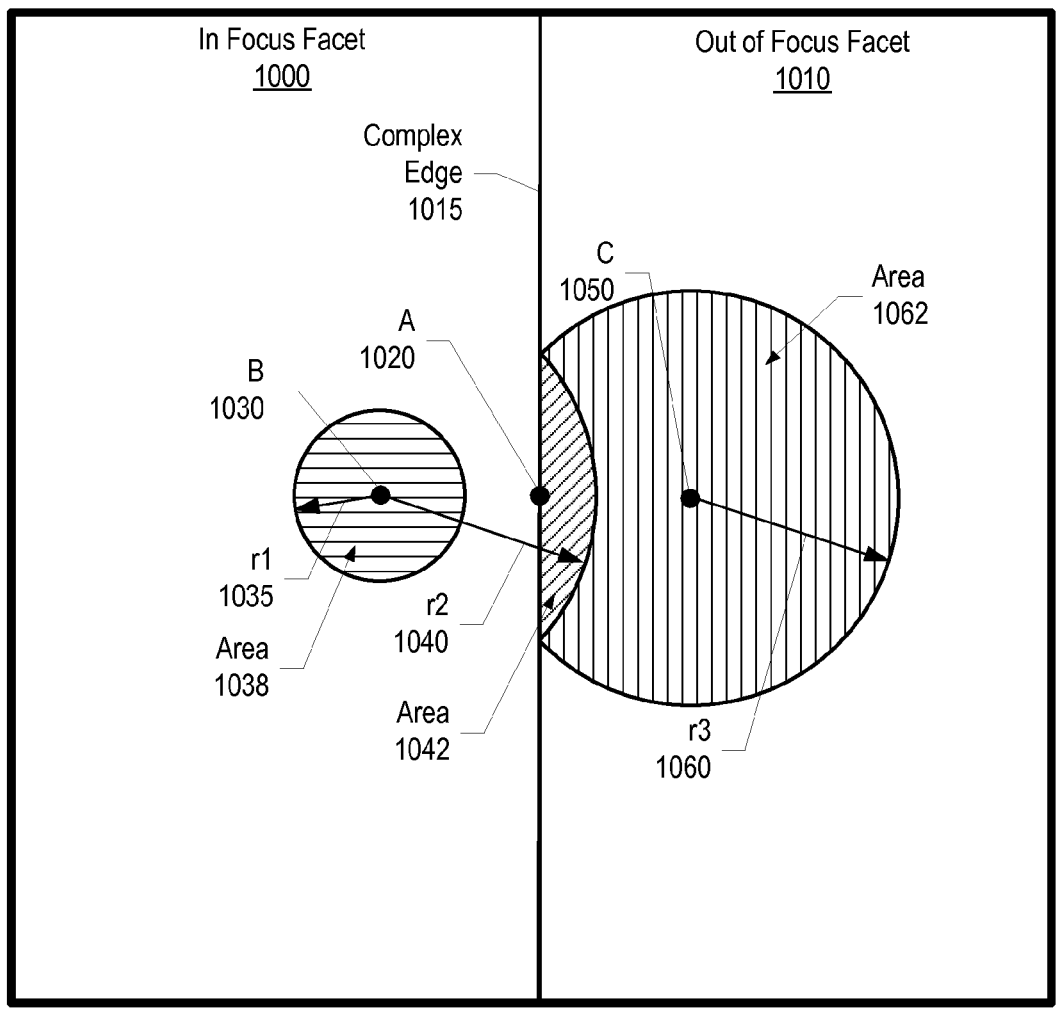
FIG. 10 is a diagram showing light sources for pixels located near a complex edge, which is an edge created by two facets at different focal lengths.

FIG. 10 is a diagram showing light sources for pixels located near a complex edge, which is an edge created by two facets at different focal lengths. In focus facet 1000 and out of focus facet 1010 create complex edge 1015. For example, in focus facet 1000 may be the front of a house and out of focus facet 1010 may be a detached garage that is located behind the house. In this example, FIG. 10 pertains to an image that was captured at a focal length equal to the distance between the front of the house and the camera, resulting in the house being in focus and the garage being out of focus.

Pixel A 1020 resides along complex edge 1015, such as the edge of the front of the house. A model generator identifies a contributing perimeter for pixel A 1020 as discussed previously and selects pixel B 1030 and C 1050 as a perimeter pixel pair. Pixel B 1030 receives light contribution from area 1038 corresponding to in focus radius 1 1035, and also from area 1042 corresponding to out of focus radius 2 1040. Area 1038 encompasses light contributions from in focus facet 1000, and area 1042 encompasses light contributions from out of focus facet 1010. As can be seen, radius 2 1040 is larger than radius 1 1035 because out of focus objects receive light contributions from a larger contributing area (see FIGS. 3-4 and corresponding text for further details). If the distance between pixels A 1020 and B 1030 is "a," the size of area 1042 is:

$$\pi r_2^2 (2 \cos^{-1}(a/r_2)/360° - a\,\mathrm{sqrt}(r_2^2 - a^2)$$

Regarding pixel C, pixel C 1050 receives light contribution from area 1062 (includes area 1042) that corresponds to radius 3 1060. Radius 3 1060 is the same as radius 2 1040 because they both are associated with the amount that out of focus facet 1010 is out of focus. As can be seen, the non-linear contribution is more relevant in the case of pixel B 1030, where area 1042's contribution is mixed with the contribution from facet 1000.

Figure 11:
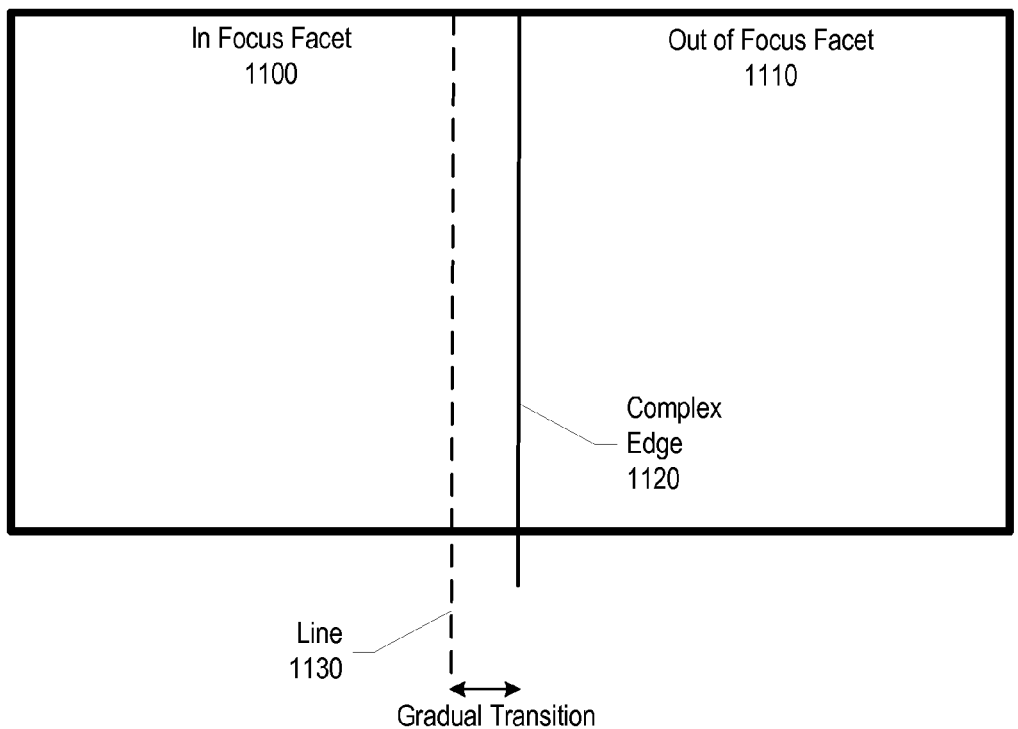
FIG. 11 is a diagram showing a gradual transition of adjoining pixel color difference values of a complex edge.

FIG. 11 is a diagram showing a gradual transition of adjoining pixel color difference values of a complex edge. Moving from left to right, line 1130 is located where the distance of a pixel from the complex edge 1120 equals $r_2$ (1040 in FIG. 10). Therefore, at this point light from out of focus facet 1110 starts contributing to pixel color. Referring back to FIG. 10, out of focus facet 1110's contribution increases from left to right up to complex edge 1120 according to the formula:

$$\pi r_2^2 (2 \cos^{-1}(a/r_2)/360° - a\,\mathrm{sqrt}(r_2^2 - a^2)$$

Past complex edge 1120, the contribution from in focus facet 1100 drops to zero (assuming it is perfectly in focus), and the color becomes the color of the out of focus facet 1110.

Figure 12A:
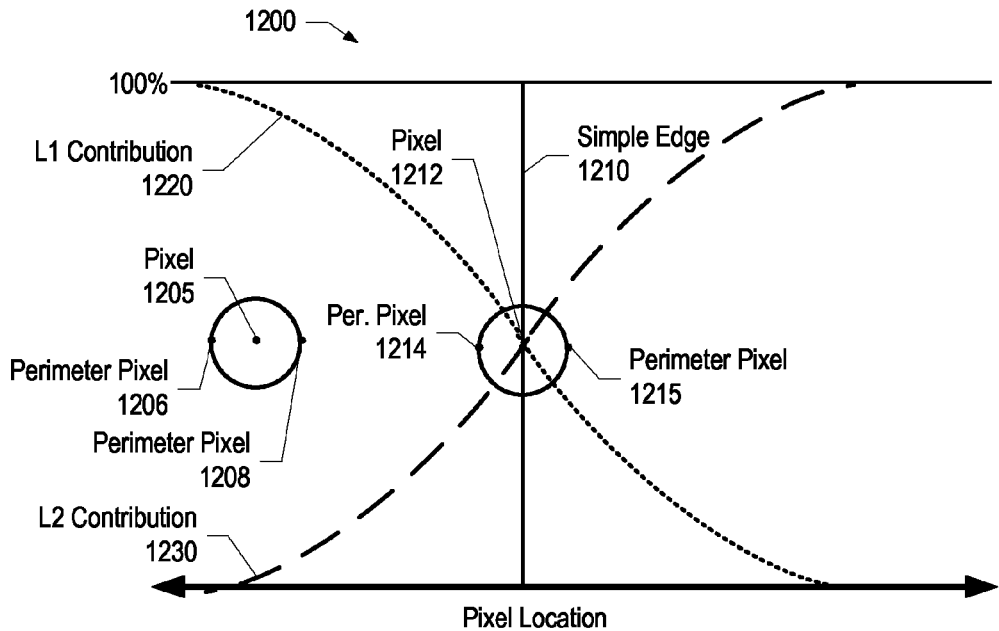
FIG. 12A is a diagram showing light contribution relationships of adjoining pixels for a simple edge.

FIG. 12A is a diagram showing light contribution relationships of adjoining pixels for a simple edge. When a pixel is on a facet (first facet) away from an edge, the pixel's corresponding pixel pairs receive light from the same light source (light 1). When a model generator evaluates a pixel away from an edge (pixel 1205), the model generator identifies its perimeter pixels 1206 and 1208 and computes a color difference. Since both perimeter pixels 1206 and 1208 receive a majority of their light from a first light source (light 1 contribution 1220), their color difference will be minimal.

As adjoining pixels become closer to simple edge 1210, one of their corresponding pixel pairs begins receiving more light from a second light source (light 2 contribution 1230). When the model generator evaluates a pixel along simple edge 1210 (pixel 1212), its perimeter pixels receive a majority of light from two different light sources. As can be seen, perimeter pixel 1214 receives a majority of light from light 1 contribution 1220 and perimeter pixel 1215 receives a majority of light from light 2 contribution 1230.

Figure 12B:
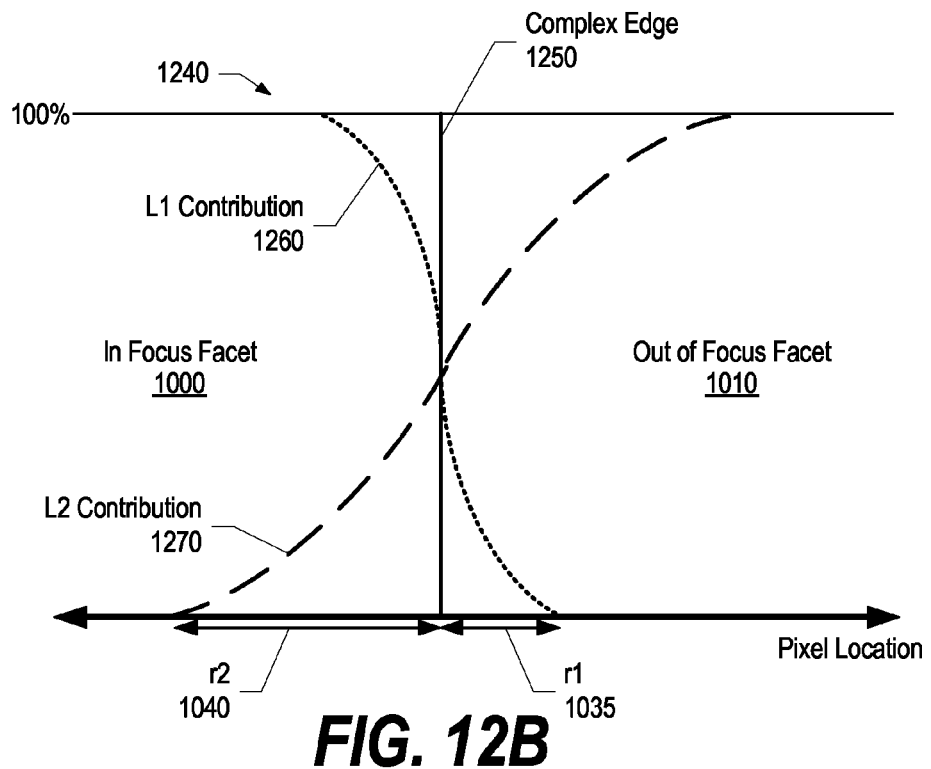
FIG. 12B is a diagram showing light contribution relationships of adjoining pixels for complex edge.

FIG. 12B is a diagram showing light contribution relationships of adjoining pixels for complex edge. L1 contribution 1260 is light coming from in focus facet 1000 and L2 contribution 1270 is light coming from out of focus 1010 facet. L2 contribution 1270 starts contributing light pixels at a distance of r2 1040 (same as FIG. 10) from complex edge 1250 in the in focus facet. The contribution increases the closer a pixel is to complex edge 1250. L1 contribution 1260 contributes to pixels close to complex edge 1250, and subsequently declines as pixels reside further from complex edge 1250 and located in out of focus facet until at a distance of r1 1035 from complex edge 1250, where its contribution is zero.

Figure 13:
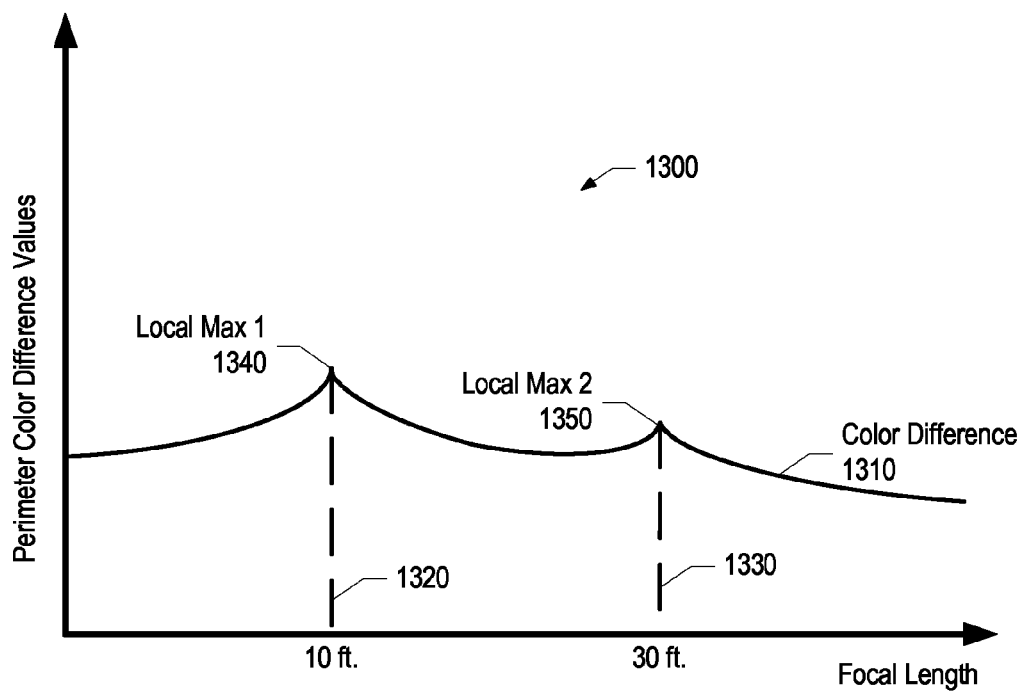
FIG. 13 is a diagram showing the relationship between an edge pixel's perimeter color difference values and the edge pixel's relative focus characteristics for a complex edge.

FIG. 13 is a diagram showing the relationship between an edge pixel's perimeter color difference values and the edge pixel's relative focus characteristics for a complex edge. As discussed in FIG. 8B, an edge pixel has a larger perimeter color difference value when the edge is in focus, thus producing a local maximum at the focal length that is closest to the edge. Since a complex edge has two facets that are at different focal lengths, a complex edge's edge pixel produces two local maximums at the two different focal lengths.

Graph 1300 shows that color difference 1310 peaks at focal length 1320 and focal length 1330. Using FIG. 9 as an example, focal length 1320 corresponds to focal length A 920 and focal length 1330 corresponds to focal length B 940. As a result, a complex edge produces two local maximums (local maximum 1 1340 and local maximum 2 1350), which a model generator utilizes to identify complex edges versus simple edges.

Figure 14:
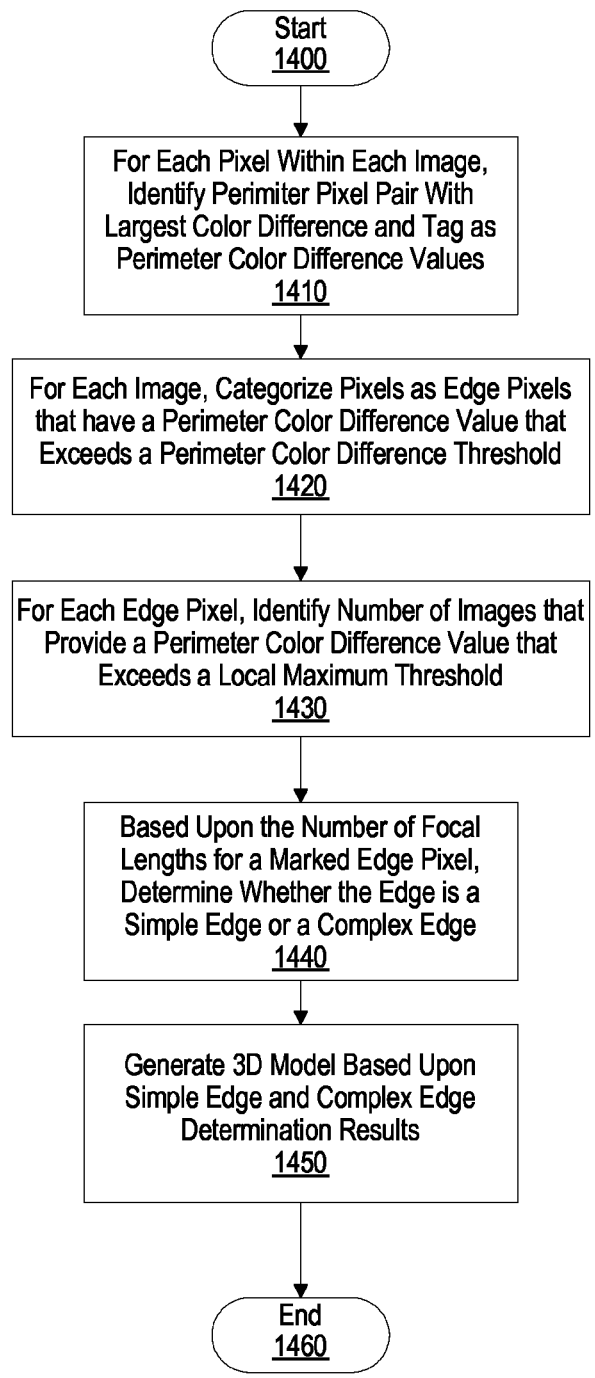
FIG. 14 is a high level flowchart showing steps taken in generating a model using image focal length information.

FIG. 14 is a high level flowchart showing steps taken in generating a model using image focal length information. Processing commences at 1400, whereupon processing identifies a largest perimeter color difference value for each pixel within each image. Meaning, processing evaluates perimeter pixel pairs for each pixel (see FIG. 6) and identifies the pixel pair that has the largest color difference value. The largest color difference for a given pixel is the pixel's perimeter color difference value. After processing has evaluated each pixel on each image, and identified each pixel's perimeter color difference value, processing proceeds to step 1420.

At step 1420, processing categorizes pixels as edge pixels whose perimeter color difference value exceeds a perimeter color difference threshold. In one embodiment, the perimeter color difference threshold may be user defined. In another embodiment, the processing may compute the perimeter color difference threshold based upon the all of the perimeter color difference values, such as categorizing the top 10% as edge pixels.

Processing, at step 1430, analyzes each edge pixel and determines the number of images that provide a perimeter color difference value that produces a local maximum for the edge pixel. For example, processing may evaluate ten pictures and categorize an edge pixel at location (45,324). In this example, processing evaluates each image's pixel location (45,324) to determine which images produce a larger perimeter color difference value at the pixel compared with adjoining images, which are the images with the next shortest focal length and the next longer focal length. The images that produce these local "peaks" in perimeter color difference values are images that have the corresponding edge in focus (see FIGS. 8B, 13, and corresponding text for further details).

Based upon the number a number of local maximums for a given edge pixel, processing categorizes the edge as either a simple edge (one local maximum) or a complex edge (two local maximums) (step 1440). Processing, at step 1450, then generates a 3-dimensional model based upon the categorized simple edges and complex edges. Processing ends at 1460.

Figure 15:
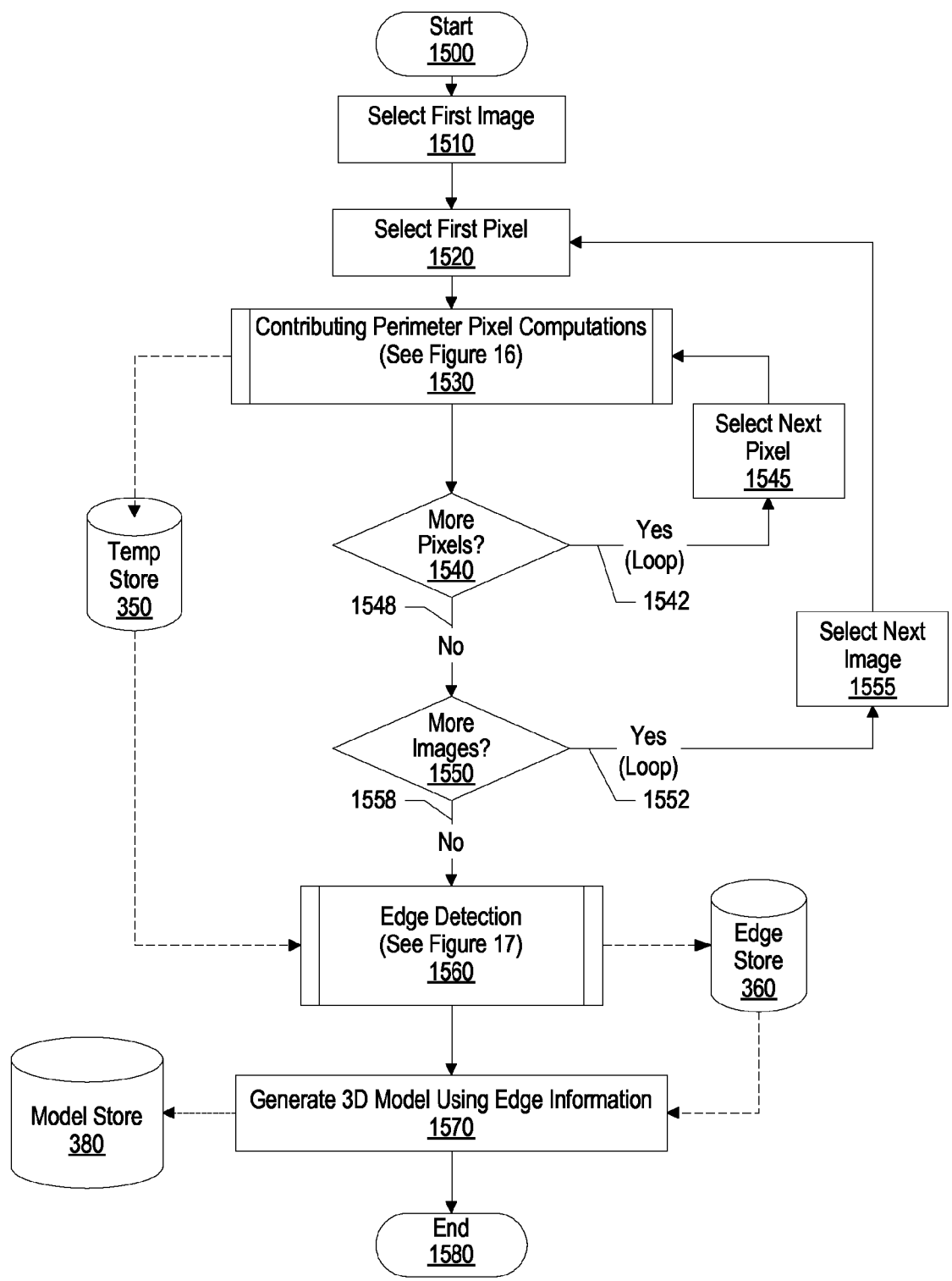
FIG. 15 is a flowchart showing steps taken in generating a model using different images taken at different focal lengths.

FIG. 15 is a flowchart showing steps taken in generating a model using different images taken at different focal lengths. Processing commences at 1500, whereupon processing selects a first image at step 1510. The first image was taken at a particular focal length, such as 10 feet. At step 1520, processing selects a first pixel from the first image, such as an upper left pixel that is far enough from the image's edge to have each of its perimeter pixels in the image.

Figure 16:
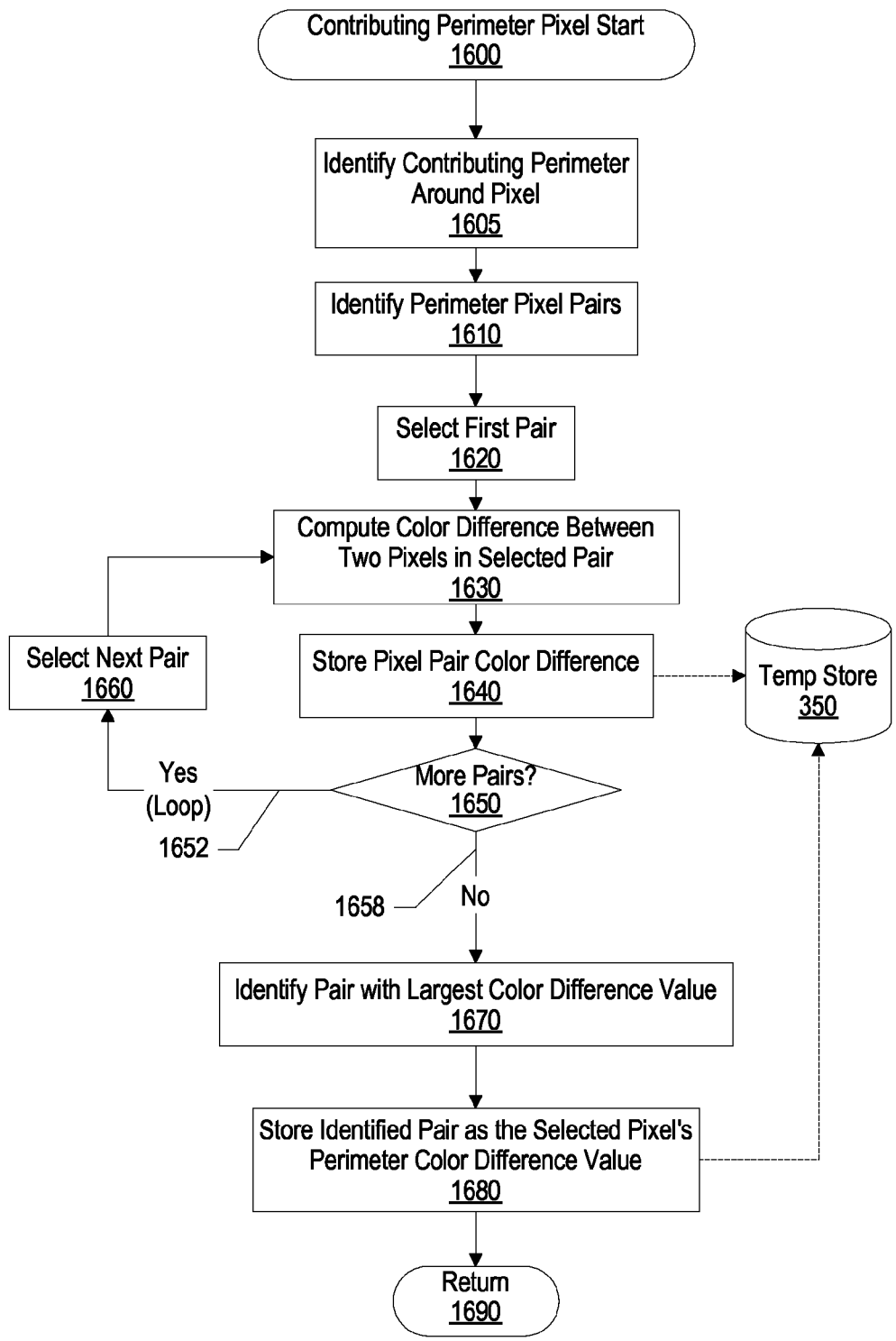
FIG. 16 is a flowchart showing steps taken in identifying a pixel's perimeter color difference value.

Processing proceeds through a series of steps in order to identify perimeter pixel pairs for the selected pixel and determine which perimeter pixel pair has a largest color difference value (pre-defined process block 1530, see FIG. 16 and corresponding text for further details). The selected pixel's largest pixel pair color difference value is associated with the selected pixel and stored as a perimeter color difference value in temporary store 350. In one embodiment, the selected image's corresponding focal length is also stored with the perimeter color difference value.

A determination is made as to whether there are more pixels included in the first image to process (decision 1540). If there are more pixels to process, decision 1540 branches to "Yes" branch 1542, which loops back to select (step 1545) and process the next pixel. This looping continues until there are no more pixels to process in the first image, at which point decision 1540 branches to "No" branch 1548.

A determination is made as to whether there are more images to process (decision 1550). If there are more images to process, decision 1550 branches to "Yes" branch 1552, which loops back to select (step 1555) and process pixels within the next image. This looping continues until there are no more images to process, at which point decision 1550 branches to "No" branch 1558 whereupon processing detects edges based upon the perimeter color difference values stored in temporary store 350. The edges may be simple edges, such as a corner of a house, or the edges may be complex, such as a detached garage behind a house (pre-defined process block 1560, see FIG. 17 and corresponding text for further details). Processing stores the detection results in edge store 360. Edge store 360 is the same as that shown in FIG. 3.

Next, processing generates a 3D model from the information stored in edge store 360, and stores the model in model store 380 (step 1570). Model store is the same as that shown in FIG. 3. Processing ends at 1580.

FIG. 16 is a flowchart showing steps taken in identifying a pixel's perimeter color difference value. Processing commences at 1600, whereupon processing identifies a contributing perimeter around a pixel (step 1605). As discussed in FIG. 3 the size of the contributing perimeter is based upon how much the most focused image could be out of focus.

At step 1610, processing identifies perimeter pixel pairs that lie on the identified contributing perimeter (see FIG. 6 and corresponding text for further details). Once the perimeter pixel pairs are identified, processing computes a pixel pair color difference value for each of the pairs at step 1630.

Processing then stores the pixel pair color difference value for the selected pixel pair in temp store 350 (step 1640). Temp store 350 is the same as that shown in FIG. 3.

A determination is made as to whether there are more pixel pairs in which to compute a color difference (decision 1650). If there are more pixel pairs in which to compute a color difference, decision 1650 branches to "Yes" branch 1652, which loops back to select (step 1660) and process the next pixel pair. This looping continues until there are no more pixel pairs in which to process, at which point decision 1650 branches to "No" branch 1658.

At step 1670, processing identifies the pixel pair with the largest color difference value, which is the pair that is perpendicular to an edge (if the pixel lies on the edge, see FIG. 6 and corresponding text for further details). Once identified, processing stores the identified pixel pair color difference value as a "perimeter color difference value" for the selected pixel at step 1680. Processing returns at 1690.

Figure 17:
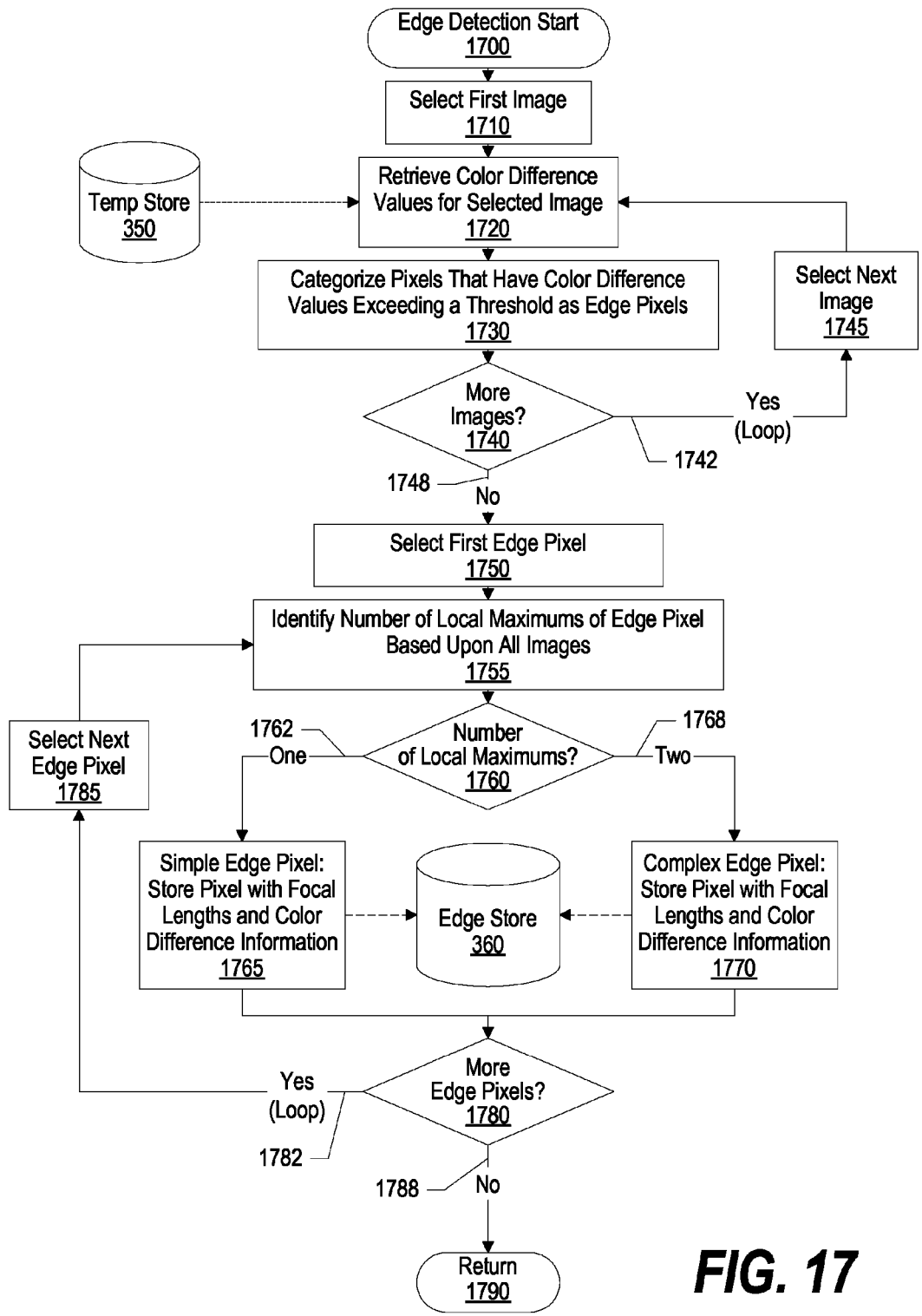
FIG. 17 is a flowchart showing steps taken in detecting edges using image focal length information.

FIG. 17 is a flowchart showing steps taken in detecting edges using image focal length information. Processing commences at 1700, whereupon processing selects a first image at 1710, which is taken at a particular focal length. At step 1720, processing retrieves perimeter color difference values from temporary store 350 for each of the selected image's pixels (computed using steps shown in FIG. 16). Temporary store 350 is the same as that shown in FIG. 3.

Processing categorizes pixels as edge pixels that have a perimeter color difference value that exceeds a perimeter color difference threshold at step 1730. As discussed earlier, pixels that reside on an edge location have the largest color difference due to the fact that that a perimeter pixel on one facet receives light from a first light source and its opposing perimeter pixel receives light from a different light source.

A determination is made as to whether there are more images to process (decision 1740). If there are more images to process, decision 1740 branches to "Yes" branch 1742 whereupon processing selects (step 1745) and processes the next image. This looping continues until there are no more images in which to process, at which point decision 1740 branches to "No" branch 1748.

At step 1750, processing selects the first edge pixel and identifies one or more local maximums based upon edge pixel's perimeter color difference values for all of the images. For example, for an edge pixel at location (104,342), processing evaluates information from each image at the particular location and determines a number of local maximums for the particular pixel (see FIGS. 8B, 13, and corresponding text for further details).

A determination is made as to the number of identified local maximums (decision 1760). If there is only one local maximum, processing branches to "One" branch 1762, whereupon processing categorizes the edge pixel as a simple edge location at a focal length that corresponds to the local maximum (e.g., 10 feet) and stores this information in edge store 360 (step 1765, see FIG. 8B and corresponding text for further details). Edge store 360 is the same as that shown in FIG. 3.

One the other hand, if there are two local maximums, processing branches to "Two" branch 1768, whereupon processing categorizes the edge pixel as a complex edge location, wherein one facet is at a focal length corresponding to the first local maximum and another facet is at a different focal length corresponding to the second local maximum (see FIG. 13 and corresponding text for further details).

A determination is made as to whether there are more edge pixels in which to process. If there are more edge pixels to process, decision 1780 branches to "Yes" branch 1782, which loops back to select (step 1785) and process the next edge pixel. This looping continues until there are no more edge pixels in which to process, at which point decision 1780 branches to "No" branch 1788 whereupon processing returns at 1790.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim Includes the introductory phrases "one or more" or "at least one" and indefinite articles such as "a" or "an"; the same holds true for the use in the claims of definite articles.

What is claimed is:

1. A computer-implemented method comprising:
computing a first image perimeter color difference value for a first pixel at a pixel location included in a first image that is captured using a first focal length, resulting in a first image perimeter color difference value;
computing a second image perimeter color difference value for a second pixel at the pixel location included in a second image that is captured using a second focal length that is different than the first focal length, resulting in a second image perimeter color difference value;
computing a third image perimeter color difference value for a third pixel at the pixel location included in a third image that is captured using a third focal length that is different than the first focal length and the second focal length, resulting in a third image perimeter color difference value;
identifying a number of local maximum color difference values at the pixel location using the first image perimeter color difference value, the second image perimeter color difference value, and the third image perimeter color difference value;
in response to identifying only one local maximum color difference value:
determining that a simple edge is located at the pixel location; and
generating a model based upon determining that the simple edge is located at the pixel location; and
in response to identifying two local maximum color difference values:
determining that a complex edge is located at the pixel location; and
generating the model based upon determining that the complex edge is located at the pixel location.

2. The method of claim 1 further comprising:
identifying a plurality of perimeter pixel pairs that correspond to the first pixel, wherein each of the perimeter pixel pairs lie on a contributing perimeter relative to the first pixel;
computing a pixel pair color difference value for each of the perimeter pixel pairs, resulting in a plurality of pixel pair color difference values;
identifying a largest pixel pair color difference value from the plurality of pixel pair color difference values; and
using the largest pixel pair difference value as the first image perimeter color difference value.

3. The method of claim 2 wherein the largest pixel pair color difference value corresponds to a perpendicular pixel pair included in the plurality of pixel pairs, the method further comprising:
wherein the perpendicular pixel pair includes a first perimeter pixel and a second perimeter pixel, the first perimeter pixel receiving a first light source within a first light dependence area, and the second perimeter pixel receiving a second light source within a second light dependence area, the first light source different than the second light source.

4. The method of claim 2 wherein, in response to the identifying only one local maximum color difference value, the method further comprises:
determining that the perpendicular pixel pair is perpendicular to the simple edge in response to identifying the largest pixel pair color difference value; and
utilizing information, during the model generation, resulting from determining that the perpendicular pixel pair is perpendicular to the simple edge.

5. The method of claim 2 wherein, in response to the identifying two local maximum color difference values, the method further comprises:
determining that the perpendicular pixel pair is perpendicular to the complex edge in response to identifying the largest pixel pair color difference value; and
utilizing information, during the model generation, resulting from determining that the perpendicular pixel pair is perpendicular to the complex edge.

6. The method of claim 1 wherein, in response to categorizing the edge as a complex edge, the method further comprises:
determining that one of the local maximum color difference values corresponds to the first image perimeter color difference value and that another one of the local maximum color difference values corresponds to the third image perimeter color difference value; and
utilizing the first focal length and the third focal length during the model generation by including a first facet as one part of the complex edge at the first focal length and including a second facet as another part of the complex edge at the third focal length.

7. A computer program product stored in a computer readable medium, comprising functional descriptive material that, when executed by an information handling system, causes the information handling system to perform actions that include:
computing a first image perimeter color difference value for a first pixel at a pixel location included in a first image that is captured using a first focal length, resulting in a first image perimeter color difference value;
computing a second image perimeter color difference value for a second pixel at the pixel location included in a second image that is captured using a second focal length that is different than the first focal length, resulting in a second image perimeter color difference value;
computing a third image perimeter color difference value for a third pixel at the pixel location included in a third image that is captured using a third focal length that is different than the first focal length and the second focal length, resulting in a third image perimeter color difference value;
identifying a number of local maximum color difference values at the pixel location using the first image perimeter color difference value, the second image perimeter color difference value, and the third image perimeter color difference value;

in response to identifying only one local maximum color difference value:
  determining that a simple edge is located at the pixel location; and
  generating a model based upon determining that the simple edge is located at the pixel location; and in response to identifying two local maximum color difference values:
  determining that a complex edge is located at the pixel location; and
  generating the model based upon determining that the complex edge is located at the pixel location.

8. The computer program product of claim 7 wherein the information handling system further performs actions that include:
  identifying a plurality of perimeter pixel pairs that correspond to the first pixel, wherein each of the perimeter pixel pairs lie on a contributing perimeter relative to the first pixel;
  computing a pixel pair color difference value for each of the perimeter pixel pairs, resulting in a plurality of pixel pair color difference values;
  identifying a largest pixel pair color difference value from the plurality of pixel pair color difference values; and
  using the largest pixel pair difference value as the first image perimeter color difference value.

9. The computer program product of claim 8 wherein the largest pixel pair color difference value corresponds to a perpendicular pixel pair included in the plurality of pixel pairs, the information handling system further performing actions that include:
  wherein the perpendicular pixel pair includes a first perimeter pixel and a second perimeter pixel, the first perimeter pixel receiving a first light source within a first light dependence area, and the second perimeter pixel receiving a second light source within a second light dependence area, the first light source different than the second light source.

10. The computer program product of claim 8 wherein, in response to the identifying only one local maximum color difference value, the information handling system further performing actions that include:
  determining that the perpendicular pixel pair is perpendicular to the simple edge in response to identifying the largest pixel pair color difference value; and
  utilizing information, during the model generation, resulting from determining that the perpendicular pixel pair is perpendicular to the simple edge.

11. The computer program product of claim 8 wherein, in response to the identifying two local maximum color difference values, the information handling system further performing actions that include:
  determining that the perpendicular pixel pair is perpendicular to the complex edge in response to identifying the largest pixel pair color difference value; and
  utilizing information, during the model generation, resulting from determining that the perpendicular pixel pair is perpendicular to the complex edge.

12. The computer program product of claim 7 wherein, in response to categorizing the edge as a complex edge, the information handling system further performing actions that include:
  determining that one of the local maximum color difference values corresponds to the first image perimeter color difference value and that another one of the local maximum color difference values corresponds to the third image perimeter color difference value; and
  utilizing the first focal length and the third focal length during the model generation by including a first facet as one part of the complex edge at the first focal length and including a second facet as another part of the complex edge at the third focal length.

13. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
  computing a first image perimeter color difference value for a first pixel at a pixel location included in a first image that is captured using a first focal length, resulting in a first image perimeter color difference value;
  computing a second image perimeter color difference value for a second pixel at the pixel location included in a second image that is captured using a second focal length that is different than the first focal length, resulting in a second image perimeter color difference value;
  computing a third image perimeter color difference value for a third pixel at the pixel location included in a third image that is captured using a third focal length that is different than the first focal length and the second focal length, resulting in a third image perimeter color difference value;
  identifying a number of local maximum color difference values at the pixel location using the first image perimeter color difference value, the second image perimeter color difference value, and the third image perimeter color difference value;
  in response to identifying only one local maximum color difference value:
    determining that a simple edge is located at the pixel location; and
    generating a model based upon determining that the simple edge is located at the pixel location; and
  in response to identifying two local maximum color difference values:
    determining that a complex edge is located at the pixel location; and
    generating the model based upon determining that the complex edge is located at the pixel location.

14. The information handling system of claim 13 wherein the information handling system further performs actions that include:
  identifying a plurality of perimeter pixel pairs that correspond to the first pixel, wherein each of the perimeter pixel pairs lie on a contributing perimeter relative to the first pixel;
  computing a pixel pair color difference value for each of the perimeter pixel pairs, resulting in a plurality of pixel pair color difference values;
  identifying a largest pixel pair color difference value from the plurality of pixel pair color difference values; and
  using the largest pixel pair difference value as the first image perimeter color difference value.

15. The information handling system of claim 14 wherein the largest pixel pair color difference value corresponds to a perpendicular pixel pair included in the plurality of pixel pairs, the information handling system further performing actions that include:

wherein the perpendicular pixel pair includes a first perimeter pixel and a second perimeter pixel, the first perimeter pixel receiving a first light source within a first light dependence area, and the second perimeter pixel receiving a second light source within a second light dependence area, the first light source different than the second light source.

16. The information handling system of claim 14 wherein, in response to the identifying only one local maximum color difference value, the information handling system further performing actions that include:

determining that the perpendicular pixel pair is perpendicular to the simple edge in response to identifying the largest pixel pair color difference value; and utilizing information, during the model generation, resulting from determining that the perpendicular pixel pair is perpendicular to the simple edge.

17. The information handling system of claim 14 wherein, in response to the identifying two local maximum color difference values, the information handling system further performing actions that include:

determining that the perpendicular pixel pair is perpendicular to the complex edge in response to identifying the largest pixel pair color difference value; and utilizing information, during the model generation, resulting from determining that the perpendicular pixel pair is perpendicular to the complex edge.

18. The information handling system of claim 13 wherein, in response to categorizing the edge as a complex edge, the information handling system further performing actions that include:

determining that one of the local maximum color difference values corresponds to the first image perimeter color difference value and that another one of the local maximum color difference values corresponds to the third image perimeter color difference value; and utilizing the first focal length and the third focal length during the model generation by including a first facet as one part of the complex edge at the first focal length and including a second facet as another part of the complex edge at the third focal length.

* * * * *